No. 627,961.  
G. E. ADAMS.  
STUD MEMBER FOR SEPARABLE FASTENERS.  
(Application filed Feb. 15, 1898.)
Patented July 4, 1899.
(No Model.)
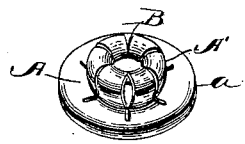
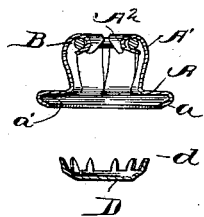
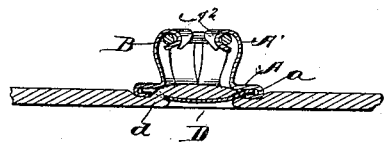
Witnesses:  
J. M. Fowler Jr.  
Alexander S. Stewart
Inventor:  
George E. Adams  
by Church & Church  
his Attorneys.

UNITED STATES PATENT OFFICE.

GEORGE E. ADAMS, OF NEW BRITAIN, CONNECTICUT.

STUD MEMBER FOR SEPARABLE FASTENERS.

SPECIFICATION forming part of Letters Patent No. 627,961, dated July 4, 1899.

Application filed February 15, 1898. Serial No. 670,385. (No model.)

*To all whom it may concern:*

Be it known that I, GEORGE E. ADAMS, a citizen of the United States, residing at New Britain, in the county of Hartford and State of Connecticut, have invented certain new and useful Improvements in Stud Members for Separable Fasteners; and I do hereby declare the following to be a full, clear, and exact description of the same, reference being had to the accompanying drawings, forming a part of this specification, and to the letters of reference marked thereon.

This invention has for its object to provide a simple and efficient stud member for separable fasteners such as are applied to garments, gloves, and the like; and the invention consists in certain novel details of construction and combinations and arrangements of parts, all as will be hereinafter described, and the particular features of novelty pointed out in the appended claims.

Referring to the accompanying drawings, Figure 1 is a perspective view of the head of the stud member constructed in accordance with my present invention. Fig. 2 is a vertical section through the same and through the fastener for securing it in place upon the garment or goods to which it is to be applied, the parts being separated to show the shape of the fastening before it is inserted. Fig. 3 is a corresponding section showing the stud member fastened to a piece of fabric or leather.

Like letters of reference in the several figures indicate the same parts.

The letter A indicates the base of the head portion of the stud member, which head portion in the preferred construction is struck up from a sheet-metal blank and has a flange or extended base portion the periphery of which is turned under at $a$ to form an undercut annular recess $a'$, Fig. 2. From the base a series of resilient arms A', arranged annularly, extend upwardly to form the stud or head proper. These arms A' are preferably formed from the periphery of the original sheet-metal blanks, although this is immaterial, and each bows outwardly at an intermediate point to form the contractile or resilient portion of the head. The extremities A² of the arms A' are turned inwardly around a small ring B, which ring is thus retained at the crown or top of the stud and suffices to unite the ends of the arms for mutual support. A stud-head formed in this manner, it is obvious, may be united to the goods in any well-known manner; but in the preferred construction, wherein the base is formed with a recess $a'$, I prefer to attach the stud to the goods by means of a fastener which will not require that the goods be perforated or especially prepared before application of the stud member. To secure this desirable end, I provide a fastening D, which is also preferably struck up from sheet metal and is formed with a series of peripheral slightly-divergent retaining-points $d$. The retaining-points $d$ are arranged in a circle, and the distance between the ends of opposite points when the parts are ready to be assembled is less than the diameter of the aperture in the bottom of the stud member formed by the flange $a$. With the parts thus constructed when the fastening D is forced up into the base of the stud member the arms $d$ will spread out into the recess $a'$, and if the fabric or garment is placed between two members as they are brought together the points or arms $d$ will penetrate the fabric or goods, and when they have been spread out into the recess $a'$ by pressure the fabric will be firmly clamped between the fastening and stud member. The points $d'$ will pass through the fabric without cutting the same, being somewhat widely separated, as shown particularly in Fig. 2.

The flange $a$ forms a "cavity," so to speak, in the bottom of the stud member, and the fastener when applied forces the goods up into this cavity, and the body of the fastener itself, being of smaller diameter than the diameter of the entrance to the cavity, may enter the same or lie substantially flush with the lower edge of the flange. Thus no projection is formed on the rear side of the goods, but, on the contrary, a slight depression is formed at the point where the fastener is applied.

The pressure used in uniting the fastener and stud member proper may be also employed to clamp the flange $a$ down upon the points $d$, and thereby insure a more firm union of the parts, although in practice this will not ordinarily be found necessary.

A stud member thus constructed, it will be seen, is exceedingly cheap, simple to manufacture, and in addition may be applied to the goods without cutting or perforating the same so as to injure the web to any appreciable extent.

Having thus described my invention, what I claim as new, and desire to secure by Letters Patent of the United States of America, is—

1. A stud member for separable fasteners having a base-flange, and upwardly-extending, outwardly-bowed resilient arms having their extremities turned inwardly and a ring held by said inwardly-turned extremities; substantially as described.

2. A stud member for separable fasteners having a series of resilient arms united at their base in the form of an outwardly-extending flange, said arms being bowed outwardly and having their extremities turned inwardly upon themselves and a ring confined within the stud member by said inwardly-turned ends of the arms; substantially as described.

GEORGE E. ADAMS.

Witnesses:
G. W. TRAUT,
S. L. FINNIGAN.